Aug. 13, 1968

H. T. WHITE

Re. 26,438

MOTOR DRIVEN PUMP

Original Filed Sept. 17, 1964

INVENTOR
HOWARD T. WHITE
BY B. T. Wolbenmith
ATTORNEY

United States Patent Office

Re. 26,438

Reissued Aug. 13, 1968

26,438

MOTOR DRIVEN PUMP

Howard T. White, Upper Moreland Township, Montgomery County, Pa., assignor, by mesne assignments, to Crane Co., New York, N.Y., a corporation of Illinois Original No. 3,280,750, dated Oct. 25, 1966, Ser. No. 397,102, Sept. 17, 1964. Application for reissue Nov. 2, 1967, Ser. No. 682,697

3 Claims. (Cl. 103—87)

Matter enclosed in heavy brackets [ ] appears in the original patent but forms no part of this reissue specification; matter printed in italics indicates the additions made by reissue.

*ABSTRACT OF THE DISCLOSURE*

*A motor driven pump has a flame trap means in the motor for passage of circulating pumped fluid. There are variable orifices between the rotor of the motor and a sleeve and between telescoped portions of an end enclosure extension and the shaft.*

Figure 1:
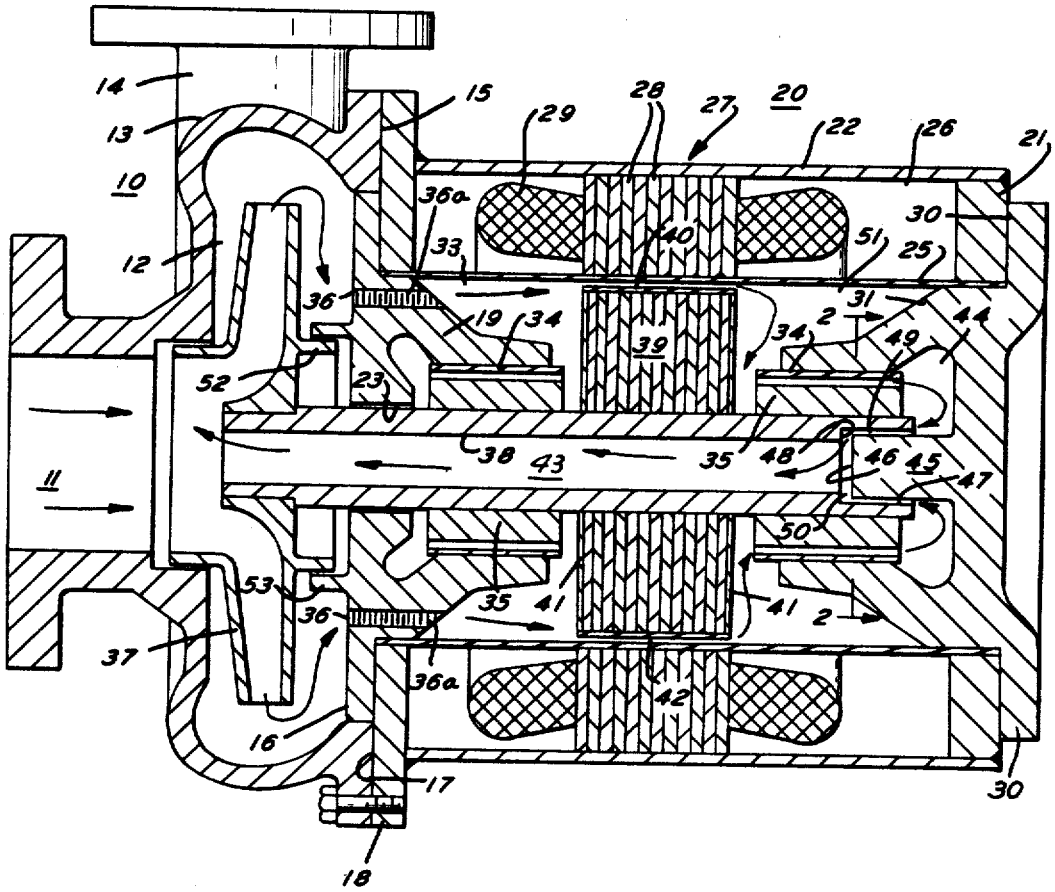

This invention relates to motor driven pumps, and more particularly to provide a pressure balancing chamber for a pump impeller to control the axial positioning of the impeller and in which a flame trap is employed in conjunction with one of the orifices controlling the pressure conditions in the balancing chamber.

Explosion proof pumps have heretofore been proposed which are particularly adapted for the pumping of highly volatile or flammable liquids. One such pump is shown in my prior Patent No. 3,053,189.

Pressure balancing chambers have been proposed for applying a force on the rotor an impeller assembly to balance the thrust applied on the impeller shaft by the impeller. Suitable balancing arrangements for motor driven pumps are shown in my prior Patents Nos. 3,053,189, and 3,138,105 and in my pending applications Serial No. 372,260, filed June 3, 1964, and Serial No. 395,136 filed September 9, 1964, now Patent No. 3,220,349.

The apparatus of the present invention provides improved pressure balancing arrangements for an impeller and motor rotor assembly which are particularly suitable for but are not limited to large pumps and which include the employment of a flame trap at one of the orifices which control the pressure balancing.

It is the principal object of the present invention to provide a motor driven pump having pressure balancing or positioning of the motor rotor and impeller which is effected by the circulation of fluid through the interior of the motor rotor and the application of balancing forces on the motor rotor, the control of the balancing forces being effected by an orifice which has a flame trap in conjunction therewith.

It is a further object of the present invention to provide a motor driven pump having improved structure for balancing axial thrust in which the motor rotor and impeller shaft having a fixed orifice at a predetermined location and preferably between the periphery of the motor rotor and the stator isolating sleeve, and a variable orifice between the shaft and a fixed member in spaced relation to the shaft, a flame trap being provided in conjunction with the variable orifice.

It is a further object of the present invention to provide a motor driven pump having improved structure for balancing axial thrust which permits of reduction or elimination of wearing rings heretofore considered essential to accommodate axial thrust.

It is a further object of the invention to provide a motor driven pump having improved structure for fluid pressure balancing of axial thrust which in and of itself supplies sufficient fluid flow for cooling and lubrication.

It is a further object of the present invention to provide a motor driven pump having an improved arrangement for fluid circulation for axial balancing and which by increasing the fluid pressure in the motor rotor chamber, increases the stability of the cooling.

Other objects and advantageous features of the invention will be apparent from the description and claims.

Figure 2:
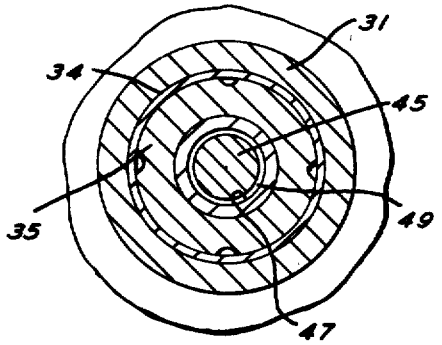

The nature and characteristic features of the invention will be more readily understood from the following description taken in connection with the accompanying drawings forming part thereof, in which:

FIGURE 1 is a vertical longitudinal central sectional view of a motor driven pump provided with provisions for balancing in accordance with the invention, parts being shown diagrammatically; and FIGURE 2 is a transverse vertical sectional view taken approximately on the line 2—2 of FIG. 1.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the invention is illustrated, an impeller housing 10 is provided having a longitudinal axial centrally disposed fluid inlet connection 11 in communication with an interior fluid space or impeller chamber 12. The fluid space 12 is enclosed within a scroll 13 of well known type. The impeller housing 10 has a fluid delivery connection 14 formed thereon and in communication with the interior of the scroll 13, for delivery of the fluid being pumped.

The impeller housing 10 has an end face 15 with a liner plate 16 has an inwardly extending or boss portion 19. 18 is provided to which the liner plate 16 can be secured in any desired manner. The end plate 18 has an inner face 17 in meeting relation to the end face 15. The liner plate 16 has an inwardly extending or boss portion 19. The impeller housing 10 and end plate 18 are secured together in a well known manner.

The end plate 18 is preferably part of a motor housing 20 which has an end plate 21 at the opposite end and a cylindrical housing member 22 connecting the end plates 18 and 21 and preferably welded thereto in fluid tight relation.

The end plates 18 and 21 have extending therebetween a cylindrical sleeve 25 of any desired material which is nonmagnetic responsive and which is resistant to corrosion by the liquid being pumped. For a number of types of installations the sleeve 25 can advantageously be of stainless steel. The sleeve 25 is secured at its ends in fluid tight relation in any desired manner, such as by linear welding, to the end plates 18 and 21. The sleeve 25, with the housing 20, provides an isolated motor stator chamber 26 within which the motor stator 27 of an alternating current motor is disposed. The stator 27 includes stator laminations 28 and windings 29 and energizing conductors (not shown).

The boss portion 19 extends within the sleeve 25 and the longitudinal axial dimension of the facing portions of the boss 19 and sleeve 25 at this location are preferably such that a flame trap is provided any gaseous material passing therealong being subjected to adiabatic expansion. If the flame trap is of a length of three-eighths of an inch the radial clearance should not be in excess of about 0.0015 inch, if of a length of one-half an inch the radial clearance should not exceed 0.002 inch, and if of a length of one inch the radial clearance should not exceed 0.0036 inch.

An end closure plate 30 is provided mounted on and secured to the end plate 21 in any suitable manner and has an inwardly extending portion or boss 31 extending within the sleeve 25 with longitudinal axial dimensions and radial clearances at the meeting portions of the boss 31 and sleeve 25 to provide a flame trap at this location, like the flame trap at the other end of the sleeve 25. The end plate portion 31 has a bearing retaining ring 34 mounted therein within which a bearing ring 35 of carbon or of any other desired type is carried, such for example as that shown in my prior Patent No. 2,741,990 and which permits fluid flow therealong. The boss portion 19 has a bearing retainer ring 34 and a bearing ring 35 is mounted therein. A motor rotor chamber 33 is thus provided within the sleeve 25 and between the boss portions 19 and 31 and communication is established between opposite sides thereof by ports or openings 36. The openings 36 have baffles 36a therein which provide an elongated passageway constituting a flame trap with limited fluid flow from the interior of the scroll 13 to the motor rotor chamber 33.

A fluid impeller 37 disposed within the scroll 13, is carried on a shaft 38 which is journalled in the bearings 35. The shaft 38 extends through a bore 23 in the liner plate 16 with a clearance to provide a flame trap at this location. For a longitudinal axial dimension of the order of three-eighths of an inch a radial clearance of .0075 inch should be provided, for one-half inch a radial clearance of .0087 inch should be provided and for a one inch length a radial clearance of .010 inch should be provided.

The shaft 38 has a motor rotor 39 secured thereto inwardly of the motor stator 27. The motor rotor 39 can be of any desired type but is preferably of the short circuited type and enclosed within an outer fluid tight casing, having a peripheral enclosure 40 and end cover plates 41, as shown in my prior Patent No. 3,111,090. The peripheral enclosure 40 and end cover plates 41 provide what is known as a "canned" rotor. The structure heretofore described is conventional and well known and has formed the basis for the design and construction of many motor driven pumps.

The length of the peripheral enclosure 40 is constant and the clearance between the peripheral enclosure 40 and the sleeve 25 provides a fixed or constant orifice 42 for purposes to be explained.

In accordance with the present invention the shaft 38 is provided with an interior axially extending passageway 43 communicating with a chamber 44 in the end closure plate 30 through a flame trap and a variable orifice. For this purpose a central cylindrical projection 45 with an end 46 is provided on the end closure plate 30 which extends into a bore 47 in the shaft 38. The bore 47 has an inner terminal shoulder 48.

The clearance between the periphery of the projection 45 and the bore 47 is such as to provide a flame trap 49 at this location. If the longitudinal axial dimension of the flame trap 49 is three-eighths of an inch the radial clearance should not exceed .0075 inch, if one-half inch the radial clearance should not exceed .0087 inch, and if one inch the radial clearance should not exceed .010 inch.

The variable clearance between the end 46 of the projection 45 and the inner terminal shoulder 48, determined by the longitudinal axial positioning of the shaft 38, provides a variable orifice 50 at this location.

The fixed orifice 42 and the variable orifice 50 define part of the motor rotor chamber 33 as a pressure fluid balancing chamber 51 at the right end of the motor rotor 39. The chamber 51 is thus available for controlled pressure application therein to bias the rotor 39 in opposition to the thrust transferred to the shaft 38 by the impeller 37.

The fluid impeller 37 can have a rim 52 in relatively closely spaced running relation to a rim 53 on the end plate 16 to prevent appreciable fluid flow at this location.

The mode of operation will now be pointed out.

Upon energization of the windings 29 a rotating field is set up in the stator laminations 28 and the motor rotor 39 is caused to rotate. Rotation of the motor rotor 39 effects rotation of the shaft 38 and the fluid impeller 37 carried thereby. Fluid supplied through the inlet connection 11 is delivered by the fluid impeller 37 to the outer portion of the impeller chamber 12 and to the scroll 13 for delivery through the fluid connection 14. The fluid impeller 37, in operation, imparts a longitudinal axial thrust to the shaft 38.

Upon rotation of the fluid impeller 37 fluid is supplied from the impeller chamber 12 fhrough the ports 36 and past the flame trap provided by the baffles 36a to the motor rotor chamber 33. A portion of the fluid entering the chamber 33 passes to and along the bearing rings 35 and through the clearance between the shaft 38 and the bore 23. Another and major portion of the fluid entering the chamber 33 passes axially through the fixed orifice 42 between the motor rotor enclosure 40 and the sleeve 25 to the pressure fluid balancing chamber 51, then through and along the bearing ring 35, to the chamber 44, then along the flame trap between the projection 45 and the bore 47, then through the variable orifice 50, then along the passageway 43 to the inlet of the impeller 37.

The pressure balancing chamber 51 has the pressure therein as determined by the fixed orifice 42 and the variable orifice 50, the discharge of fluid from the chamber 51 being controlled by the size of the variable orifice 50. If the clearance at the varible orifice 50 is caused to decrease, then the pressure in the chamber 51 tends to increase, and move the motor rotor 39 along its longitudinal axis to the left (FIG. 1) to increase the size of the variable orifice 50 and permit more rapid discharge and pressure drop in the chamber 51 with axial movement of the motor rotor 39 in conformity with the forces thereon including that in the chamber 44. If the pressure in the chamber 51 tends to decrease then the effect of the forces on the motor rotor 39 is to tend to move the motor rotor 39 along its longitudinal axis to decrease the size of the variable orifice 50 with pressure build up. A pressure balancing action is thus provided at the chamber 51 to accommodate the thrust of the impeller 37.

The flame traps heretofore referred to provide a motor driven pump which is free from the likelihood of explosion if employed from flammable fluids. A flame proof structure with resultant higher safety qualities is provided.

The flame trap 49 in its relation to the variable orifice 50 provides a simple but effective protective structure.

I claim:

1. In a motor driven pump having a housing, an interior sleeve providing a motor rotor chamber, a shaft extending transversely in said chamber, an impeller in a portion of said housing carried on said shaft and imparting a thrust longitudinally axially of said shaft, a motor rotor on said shaft in said chamber[,] *having a peripheral portion with clearance with respect to said sleeve to provide a fixed orifice,* said housing having bearings therein for said shaft, an end closure for said motor rotor chamber at one end of said housing, said end closure and said shaft having portions in telescoped relation[,] *and providing a variable orifice,* one of said bearings being in supporting relation to said shaft to maintain a clearance between said portions, said motor rotor chamber having provisions for fluid circulation therethrough including said telecscoped portions, said telescoping portions being dimensioned to provide a flame trap.

2. In a motor driven pump having
a housing,
an interior sleeve providing a motor rotor chamber,
a shaft extending transversely in said chamber,
an impeller in a portion of said housing carried on said shaft and imparting a thrust longitudinally axially of said shaft,
a motor rotor on said shaft in said chamber[,] *having a peripheral portion with clearance with respect to said sleeve to provide a fixed orifice,*
said housing having bearings therein for said shaft,
an end closure for said motor rotor chamber at one end of said housing,
said end closure and said shaft having portions in telescoped relation,
one of said bearings being in supporting relation to said shaft to maintain a clearance between said portions,
*said end closure and said shaft having portions in telescoped relation and providing a variable orifice,*
said motor chamber having provisions for fluid circulation therethrough including said telescoped portions,
the telescoping portion on said end closure being a cylindrical projection, and
the coacting shaft portion being a cylindrical bore.

3. In a motor driven pump having,
a housing,
an interior sleeve providing a motor rotor chamber,
a shaft extending transversely in said chamber,
an impeller in a portion of said housing carried on said shaft and imparting a thrust longitudinally axially of said shaft, a motor rotor on said shaft in said chamber[,] *having a peripheral portion with clearance with respect to said sleeve to provide a fixed orifice,*
said housing having *bearings* therein for said shaft,
an end closure for said motor rotor chamber at one end of said housing,
said end closure and said shaft having portions in telescoped relation[,] *and providing a variable orifice,*
one of said bearings being in supporting relation to said shaft to maintain a clearance between said portions,
said motor rotor chamber having provisions for fluid circulation therethrough including said telescoped portions,
said shaft having a fluid passageway therealong with which the clearance is in communication, and
the interior of said sleeve and said housing having flame traps for isolating the interior thereof,
one of said flame traps being at said telescoped portions.

References Cited

The following references, cited by the Examiner, are of record in the patented file of this patent or the original patent.

UNITED STATES PATENTS

| | | | |
|---|---|---|---|
| 2,741,990 | 4/1956 | White | 103—87 |
| 3,031,973 | 5/1962 | Kramer | 103—112 XR |

ROBERT M. WALKER, *Primary Examiner.*

UNITED STATES PATENT OFFICE

CERTIFICATE OF CORRECTION

Reissue No. 26,438 August 13, 1968

Howard T. White

It is certified that error appears in the above identified patent and that said Letters Patent are hereby corrected as shown below:

Column 2, line 38, "has an inwardly extending or boss portion 19." should read -- aligned therewith. A motor housing end plate --. Column 4, line 14, "fhrough" should read -- through --. Column 5, line 20, after "motor" insert -- rotor --.

Signed and sealed this 30th day of December 1969.

(SEAL)
Attest:

Edward M. Fletcher, Jr.
Attesting Officer

WILLIAM E. SCHUYLER, JR.
Commissioner of Patents